(12) United States Patent
Piquer Pérez et al.

(10) Patent No.: US 11,975,459 B2
(45) Date of Patent: May 7, 2024

(54) METHOD AND INSTALLATION FOR CUTTING A SHEET METAL FORMAT

(71) Applicants: FAGOR ARRASATE, S.COOP., Arrasate (ES); GOITI, S, COOP., Elgoibar (ES)

(72) Inventors: Jose Manuel Piquer Pérez, Irun (ES); Andoni Loiti Ochoa, Arrasate-Mondragon (ES); Luis Carlos Alvarez De Arcaya Garcia, Elgoibar (ES)

(73) Assignee: FAGOR ARRASATE, S.COOP., Arrasate (ES)

( * ) Notice: Subject to any disclaimer, the term of this patent is extended or adjusted under 35 U.S.C. 154(b) by 0 days.

(21) Appl. No.: 17/162,825

(22) Filed: Jan. 29, 2021

(65) Prior Publication Data

US 2021/0252729 A1    Aug. 19, 2021

(30) Foreign Application Priority Data

Feb. 13, 2020   (EP) .................................... 20382105

(51) Int. Cl.
  *B26D 5/00*    (2006.01)
  *B26D 1/06*    (2006.01)
(52) U.S. Cl.
  CPC ............. B26D 5/005 (2013.01); B26D 1/065 (2013.01)
(58) Field of Classification Search
  CPC ...... B26D 5/005; B26D 1/065; B23K 26/082; B23K 26/0846; B23K 37/047; B23D 33/02; B23D 35/007; B23D 19/06; B21B 2015/0021; B21B 37/68

USPC ... 83/56, 35, 34, 76.8, 425.2, 433, 498, 364, 83/365, 368, 425.3, 428, 71
See application file for complete search history.

(56) References Cited

U.S. PATENT DOCUMENTS 3,570,735 A * 3/1971 Kurz ........................ G05D 5/06
                                                                 242/534.1
3,719,114 A * 3/1973 Vischulis ............... B29D 30/46
                                                                 83/358
(Continued)

FOREIGN PATENT DOCUMENTS

DE   102013203386 A1   8/2014
DE   WO 2020078792 A1 *   4/2020 ......... B23K 26/0846
(Continued)

OTHER PUBLICATIONS

Extended European Search Report received in EP application No. 20382105.3, dated Nov. 3, 2020 (20 pages).

*Primary Examiner* — Ghassem Alie
(74) *Attorney, Agent, or Firm* — Edell, Shapiro & Finnan, LLC (57) ABSTRACT

Disclosed is a method and installation for cutting a sheet metal format with a predetermined contour from a sheet metal strip supplied in a forward movement direction. The sheet metal is cut by means of a cutting head. A distance is measured from a point of an edge of the sheet metal strip aligned with the cutting head in a direction perpendicular to the forward movement direction is measured with respect to a reference point and in perpendicular direction. A corrected cutting path is calculated from a predetermined cutting path depending on the measured distance, and the cutting head is caused to follow the corrected cutting path.

14 Claims, 3 Drawing Sheets

(56) References Cited

U.S. PATENT DOCUMENTS

| | | | | |
|---|---|---|---|---|
| 4,358,978 | A * | 11/1982 | Lawson | B23D 19/06 |
| | | | | 83/365 |
| 4,475,422 | A * | 10/1984 | Lawson | B23D 33/00 |
| | | | | 83/13 |
| 4,541,317 | A * | 9/1985 | Van Humbeeck | B42D 25/00 |
| | | | | 83/72 |
| 5,074,178 | A * | 12/1991 | Shetley | B26D 9/00 |
| | | | | 83/365 |
| 6,202,524 | B1 * | 3/2001 | Cunningham | C03B 33/03 |
| | | | | 83/13 |
| 2003/0033915 | A1 * | 2/2003 | Glemser | B65H 35/08 |
| | | | | 83/26 |
| 2004/0168556 | A1 * | 9/2004 | Noe | B23D 35/007 |
| | | | | 83/35 |
| 2008/0106022 | A1 * | 5/2008 | Sussmeier | B65H 15/004 |
| | | | | 270/5.03 |
| 2008/0318395 | A1 * | 12/2008 | Farnworth | H01L 22/20 |
| | | | | 257/E21.702 |
| 2009/0031870 | A1 * | 2/2009 | O'Connor | B25B 11/005 |
| | | | | 269/21 |
| 2015/0190883 | A1 | 7/2015 | Erlwein | |
| 2019/0143551 | A1 * | 5/2019 | Yoshida | B26D 5/00 |
| | | | | 83/365 |

FOREIGN PATENT DOCUMENTS

| | | | | | |
|---|---|---|---|---|---|
| EP | | 2828029 | A1 | 1/2015 | |
| GB | | 2492581 | A * | 7/2011 | B23D 19/06 |
| IT | WO | 2016203419 | A1 * | 6/2016 | B23K 23/03 |
| JP | | 5332577 | B2 * | 11/2013 | B23D 19/06 |

\* cited by examiner

METHOD AND INSTALLATION FOR CUTTING A SHEET METAL FORMAT

CROSS-REFERENCE TO RELATED APPLICATIONS

This application relates to and claims the benefit and priority to European Patent Application No. EP20382105.3, filed Feb. 13, 2020.

TECHNICAL FIELD

The present invention relates to methods and installations for cutting a sheet metal strip supplied continuously in a forward movement direction, and obtaining, after cutting, a sheet metal format with a predetermined contour.

BACKGROUND

Installations are known in which cutting of a sheet metal strip supplied continuously in a forward movement direction is performed for obtaining a sheet metal format with a predetermined contour. Cutting is performed by means of one or more cutting heads which are moved following the specific cutting path, which depends on the contour of the format to be obtained. Usually the cutting head can be moved in the forward movement direction and in a direction perpendicular to said forward movement direction.

Ideally, the sheet metal strip comprises a constant width and is supplied in the forward movement direction without any deviation, and the cutting path established for the cutting head is determined or calculated under those premises. However, if the sheet metal strip presents any deviation while being supplied and/or its width is not homogeneous, the resulting format after causing the movement of the cutting head following the predetermined cutting path would not be the desired format.

As a result, the need for being able to detect those possible deviations and/or lack of homogeneity of the sheet metal strip for being able to adapt or adjust the cutting path to be followed by the cutting head depending on these detections has been identified. A corrected cutting path based on the predetermined (original) cutting path and taking into account said detections could thereby be obtained, and the obtained format would have a contour identical to the one required.

EP2828029A1 discloses a cutting method including a solution of this type. In said method, a distance with respect to a first reference point from an edge of the sheet metal strip upstream of the cutting head in the forward movement direction, in a direction perpendicular to the forward movement direction, is measured; a corrected cutting path is calculated from a predetermined cutting path for the required contour (original cutting path as previously described), considering to that end the first measured distance (said predetermined cutting path is adapted or adjusted); and a cut is generated in the sheet metal strip, causing the cutting head to move following the corrected cutting path.

SUMMARY

Disclosed is a method and an installation for cutting a sheet metal format with a predetermined contour from a sheet metal strip supplied continuously in a forward movement direction.

A first aspect relates to a method for cutting a sheet metal format with a predetermined contour from a sheet metal strip supplied continuously in a forward movement direction. The method comprises a cutting step in which the corresponding cutting is performed in the sheet metal strip by means of at least one cutting head hitting or acting on said sheet metal strip, the movement of said cutting head being caused depending on the required contour of the format.

The method further comprises measuring a first distance from a first edge of the sheet metal strip with respect to a first reference point, in a direction perpendicular to the forward movement direction; calculating a corrected cutting path from a predetermined cutting path for the required predetermined contour, considering the first distance measured; and generating a cut in the sheet metal strip, causing the cutting head to move following the corrected cutting path.

Depending on the required predetermined contour, which usually requires predetermined tolerances, a predetermined cutting path is previously calculated, as previously described. Said cutting path is the path the cutting head must theoretically follow when cutting the sheet metal strip, for obtaining the sheet metal format with said predetermined contour. This cutting path is the required path provided that some premises are maintained, the supply of the sheet metal strip in the forward movement direction without deviations, for example, being one of said premises.

However, in practice it is known that a sheet metal strip is not supplied in this manner, where there may be deviations that can negatively affect the end result after cutting if nothing is done to prevent it. When measuring the distance from the edge in the perpendicular direction and comparing it with a reference point, which is representative of a reference position of said edge and/or of the longitudinal central axis of the sheet metal strip, the deviation of the sheet metal can be determined with respect to the predetermined situation and based on which the predetermined cutting path has been predetermined, and the cutting path for the head can be adjusted considering said deviation, thereby obtaining the corrected cutting path as a result. As a result of this corrected cutting path, the movement of the cutting head is adapted or adjusted to the possible deviations of the sheet metal strip while being supplied, and formats with the required predetermined contour are obtained (within required tolerances).

In the method, furthermore, the measurement of the first distance is performed at a point of the sheet metal strip that is aligned in the direction perpendicular to the forward movement direction with the point of the sheet metal strip hit by the cutting head, such that the precise deviation to be corrected by the cutting head is being measured, where the corrected cutting path can be more finely adjusted than in the state of the art, where an estimate (no matter how small it may be) of the evolution of the deviation of the sheet metal between the measurement point and the cutting point (with respect to the forward movement direction) is required.

A second aspect relates to an installation for cutting a sheet metal format with a predetermined contour from a sheet metal strip supplied continuously in a forward movement direction.

The installation comprises:
- at least one cutting head configured for performing the corresponding cutting of the sheet metal strip and movable in the forward movement direction and in a direction perpendicular to said forward movement direction;

a control device communicated with the cutting head and configured for controlling the movement of said cutting head; and a first detector configured for measuring a first distance from a first edge of the sheet metal strip with respect to a first reference point, in the direction perpendicular to said forward movement direction.

The control device is communicated with the first detector and configured for calculating a corrected cutting path from a predetermined cutting path and from the first distance measured, and the first detector is configured for measuring the first distance at a point of the sheet metal strip that is aligned with the cutting head in the direction perpendicular to said forward movement direction. The advantages mentioned for the first aspect of the invention are also obtained in the installation of the invention.

These and other advantages and features will become apparent in view of the drawings and the detailed description.

DETAILED DESCRIPTION

A first aspect relates to a method for cutting a sheet metal format with a predetermined contour from a continuous sheet metal strip 1 which is supplied in a forward movement direction X. A second aspect relates to an installation where the cutting of the sheet metal strip 1 is performed for obtaining said format with the required contour.

Figure 1:
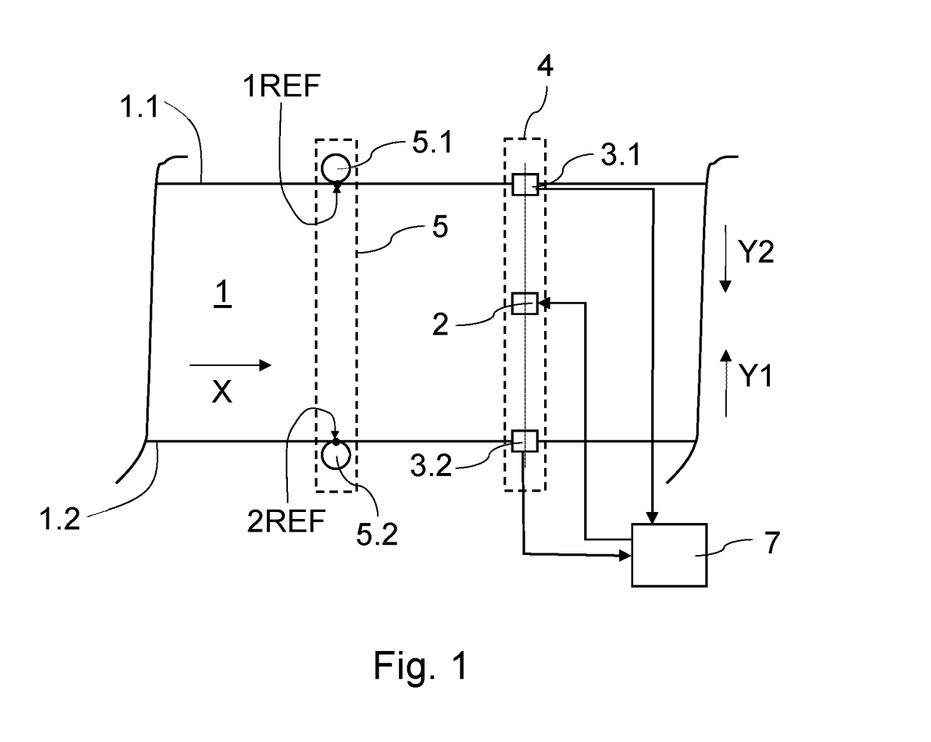
FIG. 1 shows a plan view of a guiding assembly and an operative assembly of an embodiment of an installation on a segment of a sheet metal strip.
Figure 3A:
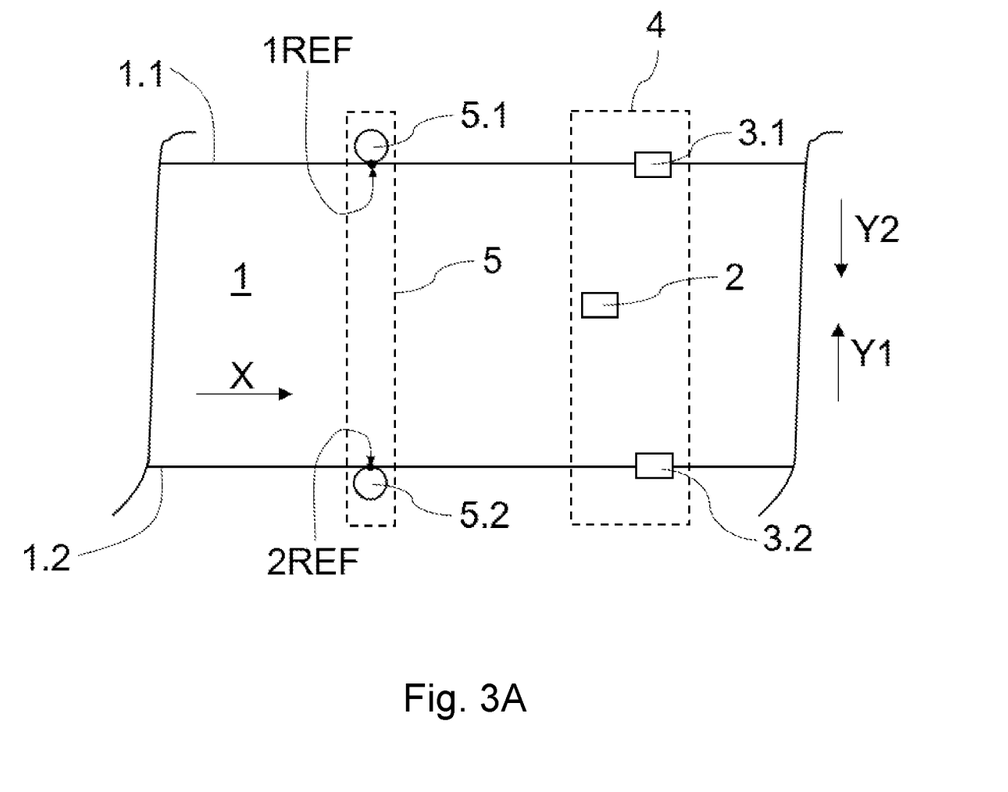
FIG. 3A shows a plan view of a guiding assembly and an operative assembly of another embodiment of an installation on a segment of a sheet metal strip.

As depicted by way of example in FIGS. 1 and 3A, the sheet metal strip 1 comprises a first longitudinal edge 1.1 and a second longitudinal edge 1.2, its width being defined between said edges 1.1 and 1.2.

The method comprises a cutting step in which the corresponding cutting of the sheet metal strip 1 is performed by means of at least one cutting head 2 hitting said sheet metal strip 1, preferably by laser, although it could be with another type of technology (plasma or water jet, for example). The cutting contour is determined depending on the cutting path followed by the cutting head 2.

In the method, furthermore:

a first distance from a first edge 1.1 of the sheet metal strip 1 with respect to a first reference point 1REF is measured, in a direction Y1, Y2 perpendicular to the forward movement direction X (first direction Y1 towards the first edge 1.1 of the sheet metal strip 1 and first direction Y2 towards the second edge 1.2 of said sheet metal strip 1, as depicted in FIGS. 1 and 3A), by means of a first detector 3.1;

a corrected cutting path T2 for the cutting head 2 is calculated from a predetermined cutting path T1 for the required predetermined contour, depending on the first distance measured; and a cut is generated in the sheet metal strip 1, causing the cutting head 2 to move following the corrected cutting path T2.

Hereinafter, when reference is made to "a measurement direction" (or "the measurement direction"), it is to be interpreted as referring to any of the directions Y1 and Y2 which are perpendicular to the forward movement direction X. The terminology "measurement direction" is used for the sake of clarity.

Preferably, the first detector 3.1 may comprise an emitter emitting light on the point in respect of which the first measurement is to be performed, and a receiver for receiving the light reflected on said point, thereby being able to detect the first distance previously indicated.

The first reference point 1REF relates to a reference position of said edge 1.1, which is preferably upstream of the cutting head 2 in the forward movement direction X and preferably refers to the position of said first edge 1.1 at said point when the method for obtaining formats with the required contour begins (when a new sheet metal strip 1 is installed and starts to be supplied in the forward movement direction X). Preferably, this position is taken as zero.

As previously described, in general, a theoretical cutting path (predetermined cutting path T1) is generated for the cutting head 2 for obtaining the format with the required contour, but once in process, the data usually differs from the theoretical data. The predetermined cutting path T1 can be calculated in a conventional or known manner. This may also occur in case where, for example, due to the deviation of the sheet metal strip 1, for example, the sheet metal strip 1 does not follow the theoretical path and if the cutting head 2 is caused to performing the corresponding cutting following the theoretical cutting path T1, the final format obtained does not comprise the required contour (or it may not even obtain any format whatsoever, with the sheet metal strip 1 not separating from the rest of the sheet metal strip 1).

This is why it is important to be able to detect these deviations, so as to be able to adjust the theoretical cutting path T1 taking into account said deviations, and thereby obtain the real cutting path (corrected cutting path T2) to be followed by the cutting head 2 for obtaining the format with the required contour despite said deviations.

In the proposed method, in order to meet this objective, the measurement of the first distance is performed on a point of the edge 1.1 of the sheet metal strip 1 that is aligned with the cutting head 2 in the measurement direction (perpendicular to the forward movement direction X), in particular aligned with the point of the sheet metal strip 1 hit by the cutting head 2. Preferably, the cutting head 2 hits or acts perpendicularly (vertically) on the sheet metal strip 1, such that the point of the edge 1.1 of the sheet metal strip 1 on which the first measurement is performed would be, in this case, aligned with said cutting head 2. Therefore, there is provided an exact measurement of the possible offset or movement of the sheet metal strip 1 with respect to the corresponding reference point, in the position of the cutting head 2, where it is unnecessary to perform any additional estimation or calculation to that end.

Figure 2A:
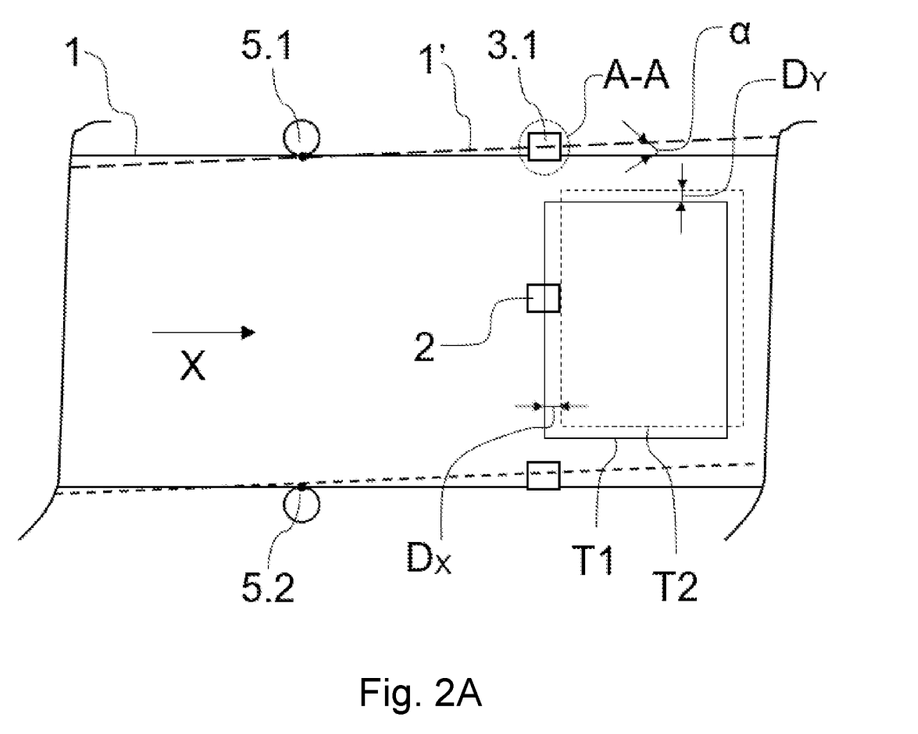
FIG. 2A shows a plan view of the guiding assembly and the operative assembly of FIG. 1 on a segment of a sheet metal strip, where a predetermined cutting path and a corrected cutting path depending on a specific deviation of the sheet metal strip while being supplied are depicted.
Figure 2B:
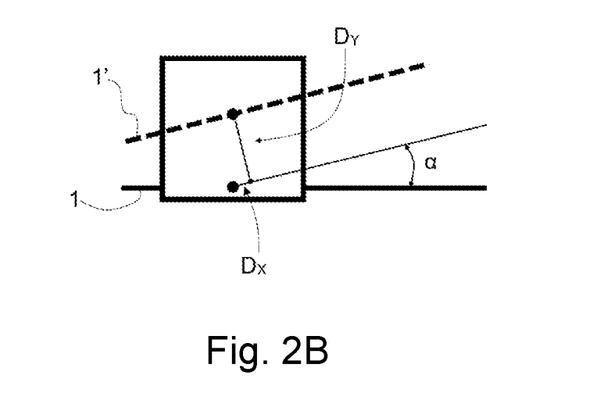
FIG. 2B shows the A-A detail of FIG. 2A.

FIG. 2A shows an example of a predetermined cutting path T1 and the corresponding corrected cutting path T2 in the event of a deviation of the sheet metal strip 1. In this example, the deviation represents a "turn" or inclination of the sheet metal strip 1 in the depicted segment, therefore it presents a deviation both in the forward movement direction X and in the measurement direction (components DX and DY, perpendicular to one another). The two components DX and DY are depicted in the adaptation of the predetermined cutting path T1 (which is the corrected cutting path T2), and are shown in further detail in FIG. 2B (where the deviation of sheet metal strip 1 with respect to the deviation of FIG. 2 has been exaggerated for the sake of clarity). The "deviated" sheet metal strip is depicted with reference number 1' in said FIGS. 2A and 2B.

Depending on the required contour for the format to be obtained after the cut, it may be necessary for the cutting head 2 to reach the first edge 1.1 or its vicinity. In this case, when said cutting head 2 arrives or is arriving at this position, the measurement performed by the first detector 3.1 may be lost. As a result, preferably, in that situation a second distance from a second edge 1.2 of the sheet metal strip 1 with respect to second reference point 2REF is measured, in the measurement direction and by means of a second detector 3.2, and the corrected cutting path T2 is calculated from the predetermined cutting path T1 for the required predetermined contour, considering the second distance measured. As with the first distance, the second distance is measured at a point of the sheet metal strip 1 that is aligned with the cutting head 2 in said measurement direction, thereby maintaining the same advantages as measuring the first distance in these situations. Therefore, the reference of the edges 1.1 and 1.2 of the sheet metal strip 1 is not lost in any case, where said path can be adjusted at any time. From this situation, the first distance measured for obtaining the corrected cutting path T2 can be used again once the cutting head 2 moves away from the first edge 1.1, or the second distance measured can continue to be used until the cutting head 2 is moved towards the second edge 1.2, at which time the first measurement is taken into account so as not to lose the reference of the sheet metal strip 1.

Preferably, the second detector 3.2 is identical to the first detector 3.1.

In the method, at least the distance from one of the edges 1.1 or 1.2 of the sheet metal strip 1 with respect to a corresponding reference point is always available, such that the measurement of a distance to be taken into account for obtaining the corrected cutting path T2 is performed continuously. Furthermore, using one of the distances does not require no longer obtaining the other distance, where both distances can be measured continuously if so required, selecting either one depending on what is required provided that the reference of the sheet metal strip 1 is not lost at any time.

The second reference point 2REF relates to a reference position of the second edge 1.2, which is preferably upstream of the cutting head 2 in the forward movement direction X and relates to the position of said second edge 1.2 at said point when the method for obtaining formats with the required contour begins (when a new sheet metal strip 1 is installed and starts to be supplied in the forward movement direction X). Preferably, this position is taken as zero.

In some embodiments of the method, when the cutting head 2 is moved towards one of the edges 1.1 and 1.2 of the sheet metal strip 1 in the first direction Y1 or in the second direction Y2, before said cutting head 2 reaches said position the detector 3.1 or 3.2 associated with said edge 1.1 or 1.2 is moved from it operative position (position in which it measures a valid distance), so as not to obstruct the path of the cutting head 2. In general, in these embodiments, if a detector 3.1 or 3.2 is in the corrected cutting path T2 obtained for the cutting head 2, said detector 3.1 and 3.2 is moved to take it out of said corrected cutting path T2, so as not to obstruct the cutting head 2. In these cases, before moving the detector 3.1 or 3.2 the measured distance taken into account to continue calculating the corrected cutting path T2 becomes the one obtained by the other detector 3.1 or 3.2, if at that time it is the measurement obtained with the detector 3.1 or 3.2 to be moved that is being taken into account.

Preferably, when a detector 3.1 or 3.2 is moved to take it out of its operative position, the movement is performed in the measurement direction, in the same direction Y1 or Y2 the cutting head 2 is moving (away from the associated edge 1.1 or 1.2). Once it is detected that the operative position of said detector 3.1 and 3.2 is out of the corrected cutting path T2 of the cutting head 2, said detector 3.1 and 3.2 is caused to return to its operative position.

These embodiments of the method are adapted for installations the detectors 3.1 and 3.2 of which are aligned in the measurement direction with the cutting head 2, as depicted in FIGS. 1 and 2.

In other embodiments of the method, the detectors 3.1 and 3.2 are not aligned in the measurement direction with the cutting head 2. In these cases, said detectors 3.1 and 3.2 have been arranged such that they may not interfere with the path of the cutting head 2, therefore it is not necessary for them to be moved out of their operative position. In these embodiments, said detectors 3.1 and 3.2 are oriented such that they are aimed at a point of the respective edge 1.1 and 1.2 of the sheet metal strip 1 which aligned with the cutting head 2 in the measurement direction. In these embodiments, there is still a problem with the cutting head 2 being able to impede the measurement of a distance when it approaches or is on an edge 1.1 and 1.2 of the sheet metal strip 1, said problem being solved as previously described.

Figure 3B:
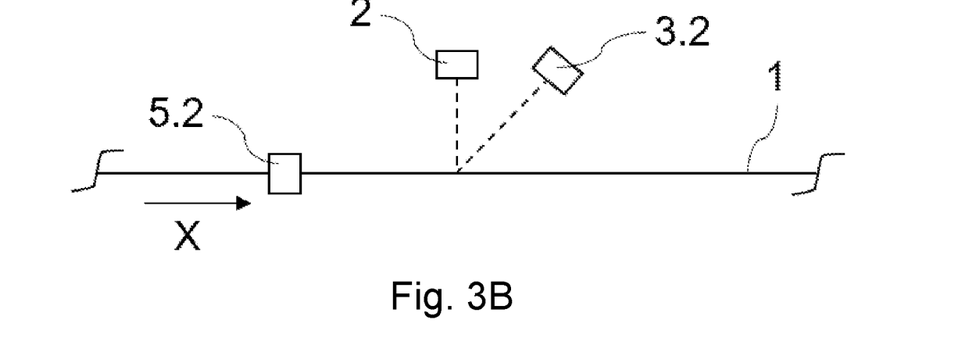
FIG. 3B shows a side view of the guiding assembly and the operative assembly of FIG. 3A, on a segment of a sheet metal strip.

These embodiments of the method are adapted for installations the detectors 3.1 and 3.2 of which are not aligned in the measurement direction with the cutting head 2, as depicted in FIGS. 3A and 3B.

The second aspect relates to an installation for cutting a sheet metal format with a predetermined contour from a sheet metal strip 1 supplied continuously in a forward movement direction X.

The installation comprises:
at least one cutting head 2 which is configured for hitting or acting on the sheet metal strip 1 and performing the corresponding cutting of the sheet metal strip 1 with said actuation, which is movable in the forward movement direction X and in the measurement direction (any of the directions Y1 and Y2 perpendicular to said forward movement direction X, as previously described);
a control device 7 communicated with the cutting head 2 and configured for controlling and causing the movement of said cutting head 2; and
a first detector 3.1 configured for measuring a first distance from a first edge 1.1 of the sheet metal strip 1 with respect to first reference point 1REF, in the measurement direction. The first reference point 1REF relates to a reference position of the first edge 1.1, which is preferably upstream of the cutting head 2 in the forward movement direction X and relates to the position of said first edge 1.1 at said point when the installation for obtaining formats with the required contour is to be started up (when a new sheet metal strip 1 is installed and the supply thereof in the forward movement direction X is to begin). Preferably, that position is taken as zero.

The control device 7 is communicated with the first detector 3.1 and is configured for calculating a corrected cutting path T2 from a predetermined cutting path T1 and from the first distance measured by said first detector 3.1, as previously explained for the method of the invention. The control device 7 may comprise a microprocessor, a processor, a microcontroller, an FPGA controller, or any other device with computing capacity.

The first detector 3.1 is configured for measuring the first distance at a point of the strip of the first edge 1.1 of the sheet metal strip 1 that is aligned with the cutting head 2 in the measurement direction. As described for the method, said point of the strip of the first edge 1.1 of the sheet metal strip 1 is aligned in particular with a point of the sheet metal strip 1 on which the cutting head 2 acts. Preferably, the cutting head 2 is arranged and configured for acting or hitting perpendicularly (vertically) the sheet metal strip 1, such that point of the edge 1.1 of the sheet metal strip 1 on which the first measurement is performed would be, in this case, aligned with said cutting head 2. Preferably, the first detector 3.1 may comprise an emitter emitting a light on the point in respect of which the first measurement is to be performed, and a receiver for receiving the light reflected on said point, thereby being able to detect the first distance previously indicated.

The installation comprises preferably a second detector 3.2 which is configured for measuring a second distance from the second edge 1.2 of the sheet metal strip 1 with respect to second reference point 2REF, in the measurement direction, that is aligned in the measurement direction with the first detector 3.1 and which is communicated with the control device 7. The control device can thereby also use the distance measured by the second detector 3.2 when required, as has explained for the method. Preferably, the second detector 3.2 is identical to the first detector 3.1.

The second reference point 2REF relates to a reference position of the second edge 1.2, which is preferably upstream of the cutting head 2 in the forward movement direction X and relates to the position of said second edge 1.2 at said point when the installation for obtaining formats with the required contour is to be started up (when new sheet metal strip 1 is installed and the supply thereof in the forward movement direction X is to begin). Preferably, that position is taken as zero.

Preferably, the installation comprises a support structure 4 movable in the forward movement direction X, the detectors 3.1 and 3.2 comprised in said installation and the cutting head 2 being attached to said support structure 4. All the detectors 3.1 and 3.2 and the cutting head 2 are thereby moved simultaneously and together (integrally) in the forward movement direction X.

As described for the method, in some embodiments of the installation the detectors 3.1 and 3.2 of said installation are aligned with the cutting head 2 in the measurement direction (see the examples of FIGS. 1 and 2) and can be moved with respect to said cutting head 2 so as not to interfere with the path of said cutting head 2 (particularly when it is directed towards one of the edges 1.1 and 1.2) in a removal direction. Preferably the removal direction is identical to the measurement direction, the corresponding detector 3.1 or 3.2 moving in the same direction Y1 or Y2 as the cutting head 2 (and where appropriate, with respect to the support structure 4). In the event that the installation comprises two detectors, detector 3.1 and 3.2 associated with each edge 1.1 and 1.2 of the sheet metal strip 1, the two detectors 3.1 and 3.2 are moved in a separate manner in the removal direction (each will be moved when appropriate).

In other embodiments of the installation, as occurred in the method, the detectors 3.1 and 3.2 are not aligned with the cutting head 2 in the measurement direction (see the examples of FIGS. 3A and 3B), not interfering in any case with the path of said cutting head 2. Therefore, the detectors 3.1 and 3.2 are not required to be movable in these embodiments. In these embodiments, furthermore, when the installation comprises two detectors 3.1 and 3.2, the detectors 3.1 and 3.2 are preferably aligned with one another in the measurement direction, and, whether aligned or not, they are preferably downstream of the cutting head 2 in the forward movement direction X. In these embodiments, furthermore, the detectors 3.1 and 3.2 are oriented such that they are aimed at a point of the corresponding edge 1.1 and 1.2 that is aligned in the measurement direction with the cutting head 2. Preferably, the detectors 3.1 and 3.2 comprise a laser lighting said point, respectively.

When the reference points 1REF and 2REF are upstream of the cutting head 2 in the forward movement direction X, the installation comprises a guiding assembly 5 comprising a first guiding device 5.1 for the first edge 1.1 of the sheet metal strip 1 and a second guiding device 5.2 for the second edge 1.1 of the sheet metal strip 1, aligned in the direction Y1, Y2 perpendicular to the forward movement direction X and arranged upstream of the cutting head 2 in said forward movement direction X. The guiding devices 5.1 and 5.2, which may comprise a spring and/or an electric actuator, are adjusted in position depending on the width of the sheet metal strip 1, said width being the separation between both guiding devices 5.1 and 5.2 in said direction Y1, Y2. The position of each of the guiding devices 5.1 and 5.2 is the reference position 1REF and 2REF, respectively. The adjustment is preferably performed when a new sheet metal strip 1 is arranged in the installation (a new sheet metal reel), and the performed adjustment is kept constant until it is detected that the first distance and/or the second distance measured exceeds a predetermined threshold value. With this threshold value, the sheet metal strip 1 is prevented from becoming excessively tensed, such that when it is detected that at least one of said distances reaches said threshold value, the guiding devices 5.1 and 5.2 are adjusted again and, as a result of the adjustment, the reference positions 1REF and 2REF are modified. With this adjustment, tension in the sheet metal strip 1 is relieved.

Preferably, the cutting head 2 and the detectors 3.1 and 3.2 form an operative assembly (and, where appropriate, the support structure 4), and the installation, as needed and/or required, may comprise a plurality of operative assemblies distributed in series along the forward movement direction X. The installation may further comprise a guiding assembly 5 associated with each of the operative assemblies (arranged upstream in the forward movement direction X with respect to the associated operative assembly); or a single guiding assembly 5 for all the operative assemblies, said guiding assembly 5 in this case being upstream of the operative assembly arranged furthest upstream in the forward movement direction X.

In general, the description provided for the method, in any of its embodiments and/or configurations, is also valid for the embodiments and/or configurations of the installation. Therefore, the installation comprises the embodiment and/or configuration suitable for supporting the corresponding embodiment and/or configuration of the method.

Likewise, the description provided for the installation, in any of its embodiments and/or configurations, is also valid for the embodiments and/or configurations of the method. Therefore, the method comprises the embodiment and/or configuration suitable for the corresponding embodiment and/or configuration of the installation.

The following clauses disclose additional embodiments.

Clause 1. Method for cutting a sheet metal format with a predetermined contour from a sheet metal strip (1) supplied continuously in a forward movement direction (X), the method comprising a cutting step in which the corresponding cutting is performed by means of at least one cutting head (2) hitting the sheet metal strip (1), the method further comprising measuring a first distance from a first edge (1.1) of the sheet metal strip (1) with respect to a first reference point (1REF) in a direction (Y1, Y2) perpendicular to the forward movement direction (X), by means of a first detector (3.1);

calculating a corrected cutting path (T2) from a predetermined cutting path (T1) for the required predetermined contour, depending on the first distance measured; and generating a cut in the sheet metal strip (1), causing the cutting head (2) to move following the corrected cutting path (T2);

the measurement of the first distance is performed at a point of the sheet metal strip (1) that is aligned in the direction (Y1, Y2) perpendicular to the forward movement direction (X) with a point of said sheet metal strip (1) hit by said cutting head (2).

Clause 2. Method according to clause 1, wherein at least when the cutting head (2) is on the first edge (1.1) of the sheet metal strip (1), a second distance from a second edge (1.2) of the sheet metal strip (1) with respect to second reference point (2REF) is measured, in a direction (Y1, Y2) perpendicular to the forward movement direction (X) and by means of a second detector (3.2), and the corrected cutting path (T2) is calculated from the predetermined cutting path (T1) for the required predetermined contour, depending on the second distance measured, the second distance being measured at a point of the sheet metal strip (1) that is aligned with the cutting head (2) in said direction (Y1, Y2) perpendicular to the forward movement direction (X).

Clause 3. Method according to clause 2, wherein when the cutting head (2) is moved to one of the edges (1.1, 1.2) of the sheet metal strip (1), before said cutting head (2) reaches said position the detector (3.1, 3.2) adapted for performing the corresponding measurement of said edge (1.1, 1.2) is moved from a position in which it performs the measurement, so as to free up the path of the cutting head (2).

Clause 4. Method according to clause 1 or 2, wherein the measurement of the corresponding distance is performed by aiming at the corresponding point of the sheet metal strip with the detector (3.1, 3.2) from an area outside of the possible path of the cutting head (2) as it approaches the corresponding edge (1.1, 1.2).

Clause 5. Method according to any of clauses 1 to 4, wherein the reference point (1REF, 2REF) is upstream in the forward movement direction (X) of the cutting head (2).

Clause 6. Cutting installation for obtaining a sheet metal format with a predetermined contour from a sheet metal strip (1) supplied continuously in a forward movement direction (X), the installation comprising at least one cutting head (2) which is configured for acting on the sheet metal strip (1) and performing the corresponding cutting of the sheet metal strip (1) and is movable in the forward movement direction (X) and in a direction (Y1, Y2) perpendicular to said forward movement direction (X); a control device (7) communicated with the cutting head (2) and configured for controlling the movement of said cutting head (2); and a first detector (3.1) configured for measuring a first distance from a first edge (1.1) of the sheet metal strip (1) with respect to first reference point (1REF), in the direction (Y1, Y2) perpendicular to the forward movement direction (X); the control device (7) being communicated with the first detector (3.1) and configured for calculating a corrected cutting path (T2) from a predetermined cutting path (T1) and from the first distance measured, the first detector (3.1) being configured for measuring the first distance at a point of the sheet metal strip (1) that is aligned in the direction (Y1, Y2) perpendicular to the forward movement direction (X) with a point of the sheet metal strip (1) on which the cutting head (2) acts.

Clause 7. Installation according to clause 6, comprising a second detector (3.2) configured for measuring a second distance from a second edge (1.2) of the sheet metal strip (1) with respect to second reference point (2REF), in the direction (Y1, Y2) perpendicular to the forward movement direction (X), the second detector (3.2) being aligned in the direction (Y1, Y2) perpendicular to the forward movement direction (X) with the first detector (3.1) and communicated with the control device (7).

Clause 8. Installation according to clause 7, comprising a support structure (4) movable in the forward movement direction (X), the detectors (3.1, 3.2) and the cutting head (2) being attached to said support structure (4), such that the detectors (3.1, 3.2) are moved integrally with said cutting head (2) in the forward movement direction (X).

Clause 9. Installation according to clause 7 or 8, wherein the detectors (3.1, 3.2) are movable with respect to the cutting head (2) independently.

Clause 10. Installation according to clause 7 or 8, wherein the detectors (3.1, 3.2) are aligned with one another in the direction (Y1, Y2) perpendicular to the forward movement direction (X) and are arranged downstream of the cutting head (2) in the forward movement direction (X) of the sheet metal strip (1), said detectors (3.1, 3.2) being oriented such that they are configured for performing the corresponding measurement on a point of the corresponding edge (1.1, 1.2) of the sheet metal strip (1) that is aligned with the cutting head (2) in the direction (Y1, Y2) perpendicular to the forward movement direction (X).

Clause 11. Installation according to any of clauses 7 to 10, comprising a guiding assembly (5) comprising a respective guiding device (5.1, 5.2) for each edge (1.1, 1.2) of the sheet metal strip (1), both guiding devices (5.1, 5.2) being aligned with one another in the direction (Y1, Y2) perpendicular to the forward movement direction (X) and arranged upstream of the cutting head (2) in the forward movement direction (X).

Clause 12. Installation according to clause 11, wherein a reference position (1REF, 2REF) is the position of the corresponding guiding device (5.1, 5.2).

Clause 13. Installation according to any of clauses 7 to 12, wherein the cutting head (2) and the two detectors (3.1, 3.2) form an operative assembly, the installation comprising a plurality of operative assemblies distributed in series in the forward movement direction (X).

Clause 14. Installation according to clause 13, comprising at least one guiding assembly (5) for all the operative assemblies, said guiding assembly (5) being upstream of the operative assembly arranged furthest upstream.

Clause 15. Installation according to clause 13, wherein each operative assembly comprises at least one associated guiding assembly (5), each guiding assembly (5) being arranged upstream in the forward movement direction (X) of its associated operative assembly.

What is claimed is:

1. A method for cutting a sheet metal format with a predetermined contour from a sheet metal strip, the method comprising:
   cutting the sheet metal strip by use of a cutting head as the sheet metal strip is advanced in a forward movement direction;
   measuring a first distance from a first edge of the sheet metal strip with respect to a first reference point in a first measurement direction by means of a first detector, the measuring of the first distance being performed at a first location that is aligned in the first measurement direction with a point on the sheet metal strip being hit by the cutting head, the cutting head being moved with respect to the first detector during the measuring of the first distance;
   calculating a corrected cutting path from a predetermined cutting path in order to produce the predetermined contour, the calculating taking into account the measured first distance; and
   causing the cutting head to follow the corrected cutting path during the cutting of the sheet metal strip.

2. The method according to claim 1, further comprising:
   while cutting the sheet metal format, moving the cutting head to a location at the first edge of the sheet metal strip;
   measuring a second distance from a second edge of the sheet metal strip with respect to a second reference point in a second measurement direction opposite the first measurement direction by means of a second detector, the measuring of the second distance being performed at a second location that is aligned in the second measurement direction with the point on the sheet metal strip being hit by the cutting head, the cutting head being moved with respect to the second detector during the measuring of the second distance; and
   calculating the corrected cutting path from the predetermined cutting path in order to produce the predetermined contour, the calculating taking into account the measured second distance.

3. The method according to claim 2, wherein the second reference point is located upstream the cutting head in relation to the forward movement direction.

4. The method according to claim 2, wherein one or both of the first and second reference points is located upstream the cutting head in relation to the forward movement direction.

5. The method according to claim 1, wherein the first reference point is located upstream the cutting head in relation to the forward movement direction.

6. The method according to claim 1, wherein the sheet metal strip is advanced continuously during the cutting of the sheet metal strip to produce the predetermined contour.

7. A cutting installation for obtaining a sheet metal format with a predetermined contour from a sheet metal strip, the installation comprising:
   a cutting head configured to cut the sheet metal strip when the sheet metal strip is moved in a forward movement direction, the cutting head being configured to move in a direction perpendicular to the forward movement direction;
   a control device; and
   a first detector configured to measure a first distance from a first edge of the sheet metal strip with respect to a first reference point in a first measurement direction, the cutting head being moveable with respect to the first detector during the measuring of the first distance, the control device being communicated with the first detector and configured to calculate a corrected cutting path from a predetermined cutting path using the measured first distance in order to produce the predetermined contour, the first detector being configured to measure the first distance at a first location that is aligned in the first measurement direction with the point on the sheet metal strip being hit by the cutting head.

8. The installation according to claim 7, further comprising a second detector configured to measure a second distance from a second edge of the sheet metal strip with respect to second reference point in a second measurement direction, the cutting head being moveable with respect to the second detector during the measuring of the second distance, the second detector configured to communicate with the control device and to measure the second distance at a second location that is aligned in the second measurement direction with the point on the sheet metal strip being hit by the cutting head.

9. The installation according to claim 8, further comprising a support structure movable in the forward movement direction, the first detector, the second detector and the cutting head being attached to the support structure such that when the support structure moves in the forward movement direction the first detector, the second detector and the cutting head move in unison in the forward movement direction.

10. The installation according to claim 8, wherein the first and second detectors are aligned with one another in the first and second measurement directions and are each moveable to a location downstream of the cutting head in relation to the forward movement direction.

11. The installation according to claim 8, further comprising a guiding assembly that includes a first guiding device associated with the first edge of the sheet metal strip and a second guiding device associated with the second edge of the sheet metal strip, the first guiding device being aligned with the second guiding device in the direction perpendicular to the forward movement direction, each of the first and second guiding devices being located upstream of the cutting head in relation to the forward movement direction.

12. The installation according to claim 11, wherein the first guiding device is located at the first reference point and the second guiding device is located at the second reference point.

13. The installation according to claim 7, further comprising a support structure movable in the forward movement direction, the first detector and the cutting head being attached to the support structure such that when the support structure moves in the forward movement direction the first detector and the cutting head move in unison in the forward movement direction.

14. The installation according to claim 13, wherein the first detector is movable to a location downstream of the cutting head in relation to the forward movement direction.

* * * * *

UNITED STATES PATENT AND TRADEMARK OFFICE
CERTIFICATE OF CORRECTION

PATENT NO. : 11,975,459 B2
APPLICATION NO. : 17/162825
DATED : May 7, 2024
INVENTOR(S) : Piquer Pérez et al.

It is certified that error appears in the above-identified patent and that said Letters Patent is hereby corrected as shown below:

On the Title Page

Item (71) Applicants, delete "GOITI, S. COOP., Elgoibar (ES)".

Signed and Sealed this
Sixth Day of August, 2024

Katherine Kelly Vidal
*Director of the United States Patent and Trademark Office*